Dec. 2, 1958    F. J. ZUIDERWEG ET AL    2,862,697
CONTACTING TRAY WITH DOWNCOMER-FEEDER
Filed Nov. 21, 1955    2 Sheets-Sheet 1
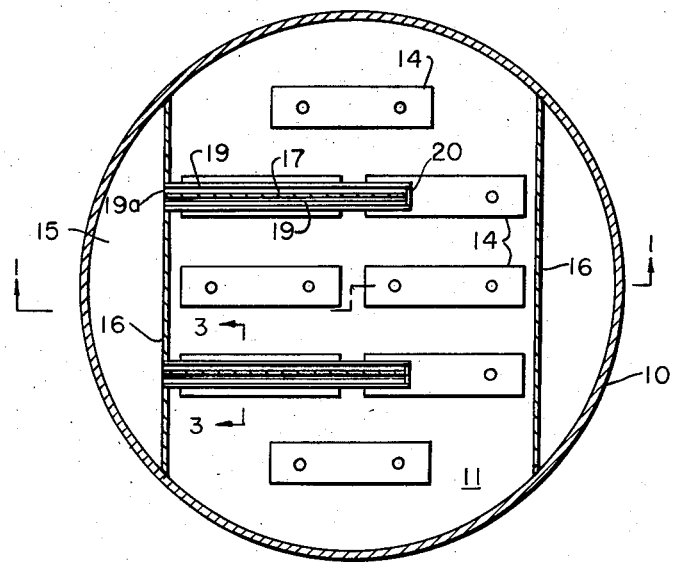
FIG. 2
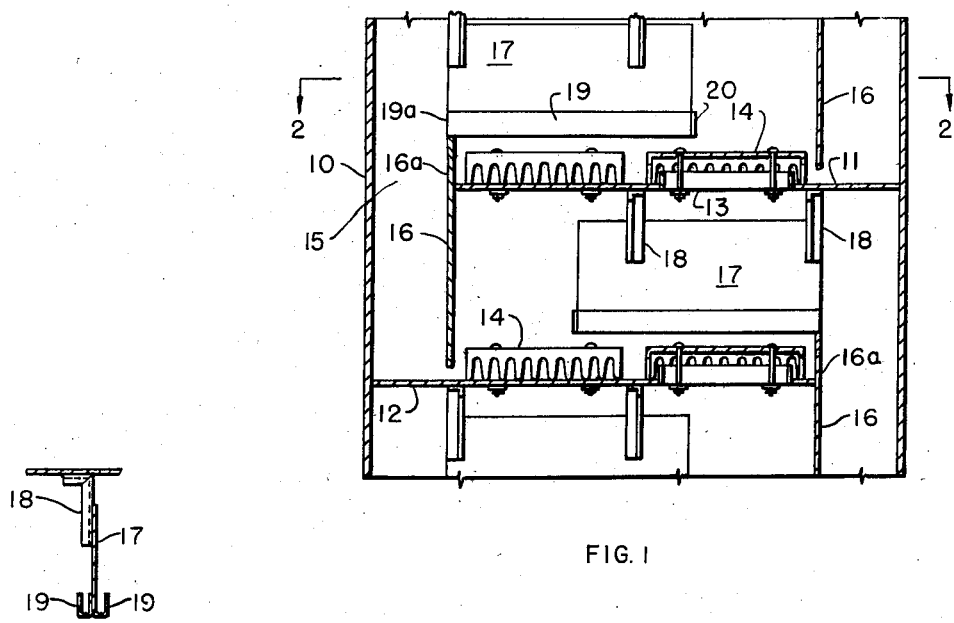
FIG. 1
FIG. 3
INVENTORS
    FREDERIK JOHANNES ZUIDERWEG
    EARL MANNING JR.
    ELMOND L. CLARIDGE
BY: *Oswald L. Wilmore*
    THEIR ATTORNEY INVENTORS
FREDERIK JOHANNES ZUIDERWEG
EARL MANNING JR.
ELMOND L. CLARIDGE
BY *Oswald H. Wilmore*
THEIR ATTORNEY United States Patent Office 2,862,697
Patented Dec. 2, 1958

2,862,697

CONTACTING TRAY WITH DOWNCOMER-FEEDER

Frederik Johannes Zuiderweg, Amsterdam, Netherlands, Earl Manning, Jr., Edwardsville, Ill., and Elmond L. Claridge, Houston, Tex., assignors to Shell Development Company, New York, N. Y., a corporation of Delaware Application November 21, 1955, Serial No. 548,187

8 Claims. (Cl. 261—114)

The invention relates to gas-liquid contacting columns, e. g., fractional distillation columns, having a plurality of vertically spaced contacting trays provided with passages for the upflow of gas (the term "gas" being used generically to include vapor) to engage liquid accumulated on the tray and produce a liquid spray above the tray, and downcomers for transferring liquid from a tray to a lower tray. More particularly, the invention is concerned with an improvement in such trays for augmenting the flow of liquid from the tray into the downcomer.

In such columns the passages for the upflow of gas may be vapor risers covered with bubble caps or simple uncovered slots or openings of any configuration. The ascending gas throws up a spray and creates on the tray a foam-like mixture of gas and liquid having a density lower than that of the pure liquid. This foam flows into the downcomer and has heretofore been recognized as producing within the downcomer a column of fluid of decreased density which materially lowers the liquid head at the bottom of the downcomer and thereby reduces the liquid-handling capacity of a downcomer of given size. (See U. S. Patent 2,682,395 to Claridge and Foecking.)

It is also known that there is another factor which often limits the liquid-handling capacity, namely, the rate at which the liquid enters the downcomer. It has heretofore been proposed to increase the flow of liquid into the downcomer by providing a liquid-collecting element, such as an auxiliary screen, tray, basin, demisting device, or the like, in spaced relation above the tray and providing a duct for leading liquid from such liquid-collecting element to the downcomer. (See U. S. Patents 1,643,696 and 2,061,830, both to Campbell, and 1,983,762 to Kotzebue.) Such devices have, however, been complicated and expensive to install and have interfered with the spray action in the inter-tray space by restricting the available spray space and/or by forming obstructions for the upward movement of the spray. The interference with the spray action is detrimental to contacting efficiency inasmuch as the effectiveness of a stage for approaching equilibrium between gas and liquid is governed largely by the uniform and extended contact between the spray and the ascending gas.

It is, therefore, the general object of the invention to provide a gas-liquid contacting tray having gas passages and a downcomer which is provided with an improved device for promoting the influx of liquid into the downcomer.

A specific object is to provide an improved contacting tray of the type indicated above having a downcomer-feeder of simple construction which occupies only a small part of the inter-tray space and neither materially interferes with the spray action nor significantly restricts the upward movement of the liquid spray through the full height of the inter-tray space.

In summary, according to the invention the tray is provided with a downcomer-feeder comprising conduit means, such as a narrow catch-trough situated in vertically spaced relation above the tray, disposed to receive liquid coalesced on an upright wall above the trough and to discharge said liquid into the downcomer. In the preferred embodiment the said upright wall is constituted by a spray-catching baffle that extends above the trough and is situated in spaced relation to the column wall; in another embodiment the said upright wall is constituted by the column wall itself. Both of these embodiments may be used in combination to collect liquid spray from various regions of the column area.

The said downcomer-feeder, because of its narrow lateral dimension, does not significantly decrease the volume of the contacting space above the tray and constitutes only a negligible obstruction to the upward movement of the liquid spray. The liquid carried by the feeder according to the invention, particularly when constructed according to the preferred embodiment, may be the only liquid supplied to the downcomer; however, additional liquid may be discharged from the tray directly into the same or into a separate downcomer, e. g., over an overflow weir.

The invention will be further described with reference to the accompanying drawing showing two embodiments, wherein:

Figure 1 is a vertical sectional view through a portion of a contacting column equipped with an improved tray according to the invention, taken on the broken line 1—1 of Figure 2;

Figure 2 is a horizontal sectional view taken on the line 2—2 of Figure 1;

Figure 3 is a fragmentary sectional view taken on the line 3—3 of Figure 2;

Figure 5:
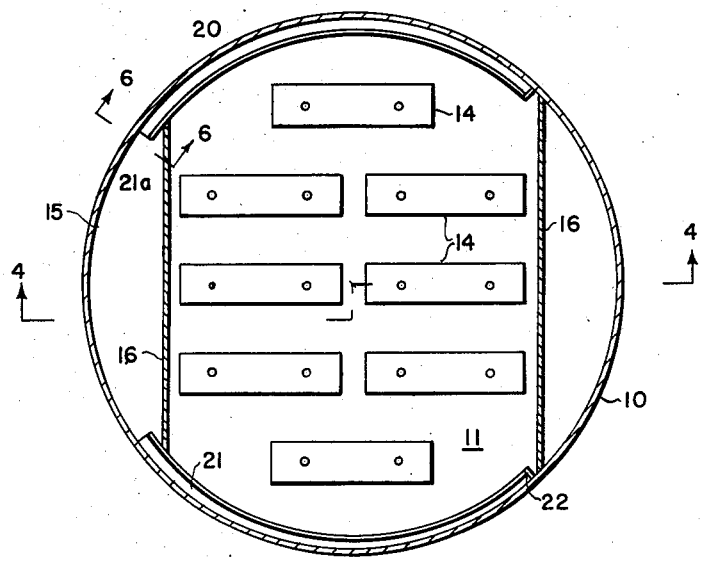
Figure 5 is a horizontal sectional view taken on the line 5—5 of Figure 4.

Referring to Figures 1-3 of the drawing in detail, 10 represents an intermediate portion of the cylindrical enclosing wall of a fractional distillation column provided with suitable means for supplying liquid reflux at the top and vapor at the bottom, for withdrawing vapor or condensate at the top and liquid at the bottom and for admitting the feed at a suitable level; these means, being well known in the art, are not shown. The column contains a plurality of horizontal, vertically spaced contacting trays, such as those shown at 11 and 12, having passages for the upflow of vapor. In the embodiment shown these passages are vapor risers 13 covered with bubble caps 14, both the passages and caps being in this instance rectangular. Each tray further has a segment-shaped downcomer opening 15 at one side thereof to which is fitted a vertical plate 16 disposed as the chord of a segment of a circle; the vertical edges of the plate 16 are sealed to the wall 10, whereby the said plate and wall form the inner and outer walls of a segment-shaped downcomer. As shown, each plate 16 may extend downwards from the respective tray to a level slightly above the next lower tray, so as to provide a liquid seal, and also somewhat above the respective tray, to form an overflow weir 16a. Liquid, which may be in the form of a foam, flows over this weir from the tray into the downcomer. The height of the weir 16a will be considered presently.

One or more auxiliary downcomer-feeders, e. g., two as illustrated, are provided above each tray, a larger number being usually desirable for columns of larger diameters. Each downcomer-feeder comprises a spray-catching baffle 17 extending through a vertically elongated zone mounted above the associated tray, preferably in spaced relation above such tray, by any suitable supports, such as brackets 18 fixed to the next higher tray. The feeder further includes a catch-trough in the form of a pair of open gutters 19 extending on the two sides of the baffle along the bottom thereof for receiving liquid that drains along the baffle. The gutters are close to horizontal and may slope slightly toward the discharge ends 19a, which are positioned to discharge the said liquid into the downcomer to supplement the liquid that overflows the weir 16a. The ends of the gutters remote from the discharge ends may be closed by plates 20. The baffle 17 is conveniently located with one lateral edge thereof adjoining the plate 16, as shown.

The tops of the gutters 19 are in most instances positioned about 4 to 10 inches above the tray for the trays shown, and somewhat lower in the case of trays the vapor passages of which do not have risers and bubble caps, e. g., trays composed of grid bars or perforated plate trays. The baffle 17 advantageously has a height above the gutter which is equal to at least one-third of the height of the inter-tray space; usually baffles of greater heights, e. g., one-half to three-fourths the height of the inter-tray space are used. The baffle preferably has a length that is large in relation to the tray width, e. g., from one-third to three-fourths of the width of the tray, to provide ample coalescing surface without in effect partitioning the inter-tray space. Inclined baffles can be used; however, it is usually advantageous to use vertical baffles, as shown, to minimize the lateral dimension of the vertical projection of the baffle onto a horizontal plane and thereby to present the smallest possible obstruction to the upward travel of the liquid spray. For the same purpose, the width of the gutters 19 is kept small. Since in most applications of the invention the major part of the liquid entering the downcomer will flow from the gutters 19, the height of the weir 16a is preferably extended to the level of the bottoms of the gutters, i. e., to a level higher in relation to the liquid head on the tray than is usual; this provides additional hydraulic head in the downcomer and permits the tray to be operated at higher loadings.

In operation, liquid entering each tray from the downcomer associated with the next higher tray flows horizontally across the tray toward the overflow weir 16a, and is engaged by the gas that ascends through the vapor riser 13 and emerges from the bubble caps 14; a liquid spray or foam is thereby thrown up into the inter-tray space. (The term "spray" is used herein to denote generically any such liquid and gas bed formed by the gas and including liquid that is disrupted to expose a large liquid surface.) The liquid in the spray is disengaged by gravity from the gas in the free space above the tray and falls again onto the tray, where part of it is again engaged by gas. This action causes a low-density bed to flow across the tray, resulting in the direct entry into the downcomer beyond the weir 16a of only limited amount of liquid. However, the auxiliary downcomer-feeder collects liquid as follows: Because of turbulence the spray moves with a lateral velocity component, so that it strikes the two sides of the catching baffle 17, both on the ascent and descent. A part of the spray is thereby coalesced and runs down along the baffle and into the open gutters 19, from which it flows into the downcomer. This coalesced liquid, being shielded from the gas currents, has a density that is higher than the above-mentioned low-density bed on the tray, sometimes approaching the density of pure liquid. Such higher-density liquid readily flows into the downcomer in ample quantity and is effective to build up at the bottom of the downcomer a liquid head that is greater than in the case of downcomers which are supplied with low-density foam from the tray.

It should be noted that the downcomer-feeder is not essentially a deentrainment or demisting device, since the upright or vertical catch-baffle 17 does not interfere significantly with the free and unobstructed upflow of the spray; it is, instead, a coalescing device for coalescing a portion of the liquid in the spray.

Figures 4, 6:
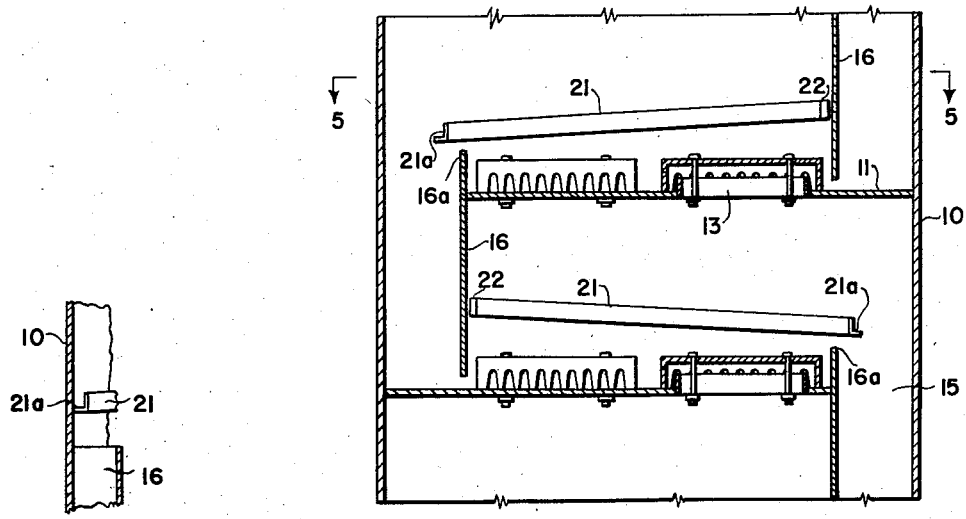
Figure 4 is a vertical sectional view through a portion of a contacting column showing a modified embodiment, taken on the broken line 4—4 of Figure 5.
Figure 6 is a fragmentary sectional view taken on the line 6—6 of Figure 5.

Referring to Figures 4–6, wherein like parts are identified with like reference characters, the auxiliary downcomer-feeder comprises a pair of narrow catch-troughs 21 extending about portions of the column wall 10. They may have a slight downward slope toward their discharge ends 21a, which are positioned to discharge liquid into the downcomer; their upper ends are closed by end plates 22. Operation of this embodiment is like that described above, with the difference that the column wall acts as the coalescing wall and the liquid that runs down along this wall is caught by the troughs. Such troughs 21 can be used in the column in combination with the troughs 19 and baffles 17 of Figures 1–3.

While the invention has been illustrated as applied to a bubble cap tray and to the case where the same downcomer is used to conduct liquid coalesced from the downcomer-feeder as well as additional liquid flowing directly from the tray over the weir 16a, it is evident that the invention is not so limited.

We claim as our invention:

1. In a gas-liquid contacting column which contains trays arranged in vertically spaced relation and having passages for the upflow of gas to engage liquid that accumulates on the trays and thereby to form a spray in the space between trays, the combination with at least one of said trays of a liquid-downcomer extending downwardly from the tray, a generally upright wall extending through a vertically elongated zone in the space immediately above said one tray so as to be engaged by liquid spray emanating from said tray and to coalesce a part of said spray, and a downcomer-feeder comprising conduit means having an inlet situated to receive coalesced liquid from said upright wall and an outlet positioned to feed all of said liquid directly into said downcomer, said conduit means being situated in spaced relation above said tray and occupying only a minor fraction of the cross sectional area of said space and leaving said space substantially open for the essentially unimpeded up-and-down passage of said spray.

2. The combination according to claim 1 wherein said conduit means is inclined downwards toward the said downcomer.

3. The combination according to claim 1 wherein said conduit means is a narrow trough situated in spaced relation above said tray adjoining a lower part of said upright wall.

4. The combination according to claim 1 wherein said upright wall is a spray-catching baffle mounted in laterally spaced relation to the column wall.

5. The combination according to claim 1 wherein said upright wall is a substantially vertical spray-catching baffle mounted in vertically spaced relation above said tray and in laterally spaced relation to the column wall and having a height at least one-third of the height of the inter-tray space and a length that is between one-third and three-fourths the width of the tray.

6. The combination according to claim 1 wherein said upright wall is the interior wall of the contacting column.

7. The combination according to claim 1 wherein said downcomer has an intake opening near the level of said tray for receiving additional liquid directly from said tray.

8. A gas-liquid contacting column including: an upright tank; a plurality of transverse, vertically spaced contacting trays for accumulating liquid, each said tray having passages for the upflow of gas to engage said accumulated liquid and thereby to form a spray, and liquid downcomer openings; a liquid downcomer fitted to each of said downcomer openings and extending downwards from the respective tray and having a liquid intake opening near the level of the respective tray for receiving accumulated liquid therefrom; a spray-catching baffle between at least one pair of adjacent trays extending upwards from a level spaced above the lower of said pair of trays; and a gutter extending along a lower part of said baffle in vertically spaced relation above the lower of said pair of trays and positioned to receive coalesced liquid flowing downward along the baffle, said gutter having a discharge end positioned to feed all of said received liquid directly into said liquid downcomer, said baffle and gutter together occupying only a minor fraction of the cross sectional area of the space between said trays and leaving said space substantially open for the unimpeded passage of said spray.

References Cited in the file of this patent

UNITED STATES PATENTS

| | | |
|---|---|---|
| 2,573,491 | Richardson | Oct. 30, 1951 |
| 2,725,343 | Lambert | Nov. 29, 1955 |
| 2,764,535 | Tyskewicz | Sept. 25, 1956 |

FOREIGN PATENTS

| | | |
|---|---|---|
| 699,768 | Germany | Apr. 26, 1941 |